Nov. 29, 1938.　　　　E. GRANAT　　　　2,138,421
DISTANT ELECTRIC CONTROL SYSTEM
Filed Sept. 29, 1936　　16 Sheets-Sheet 1
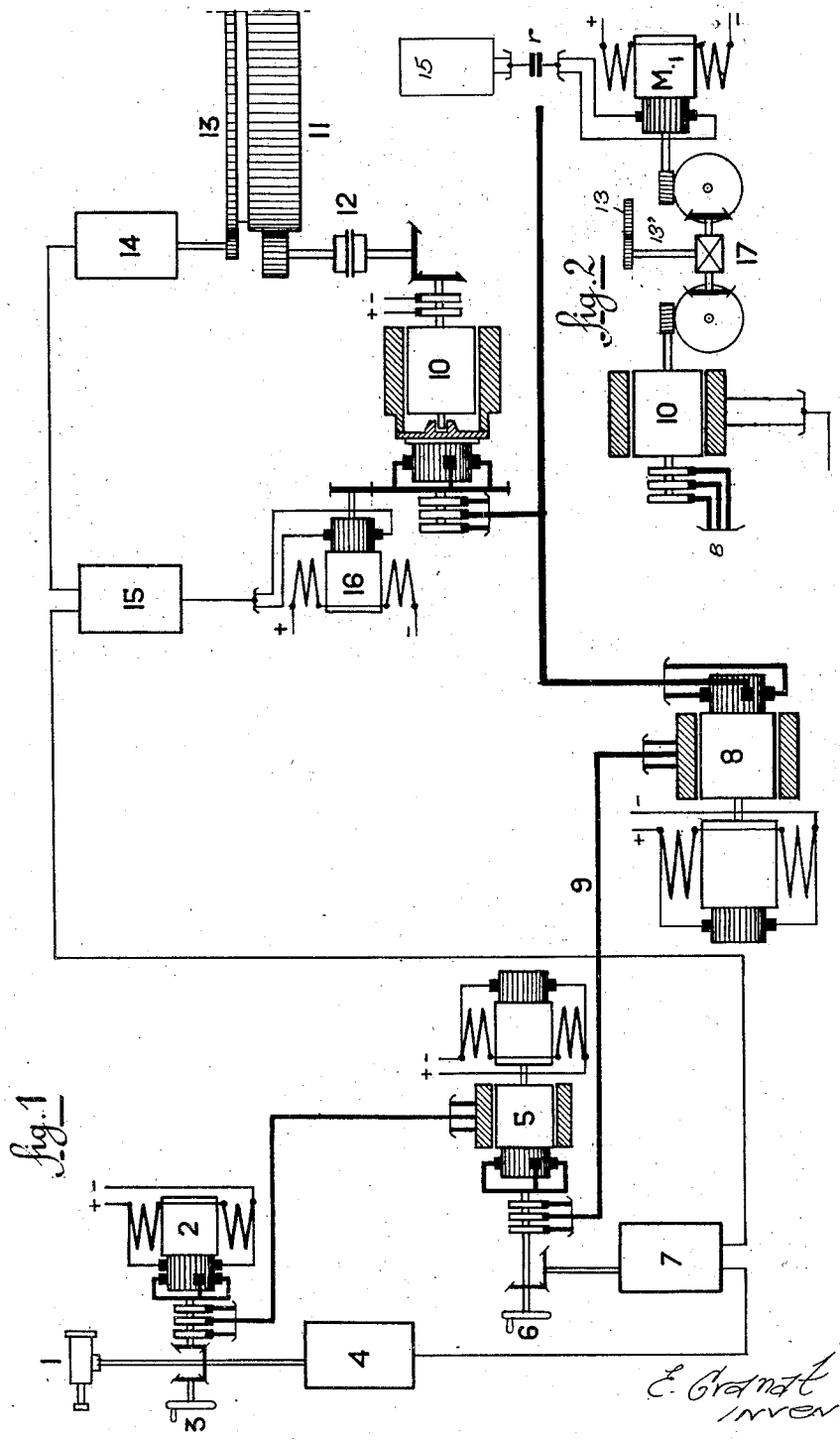

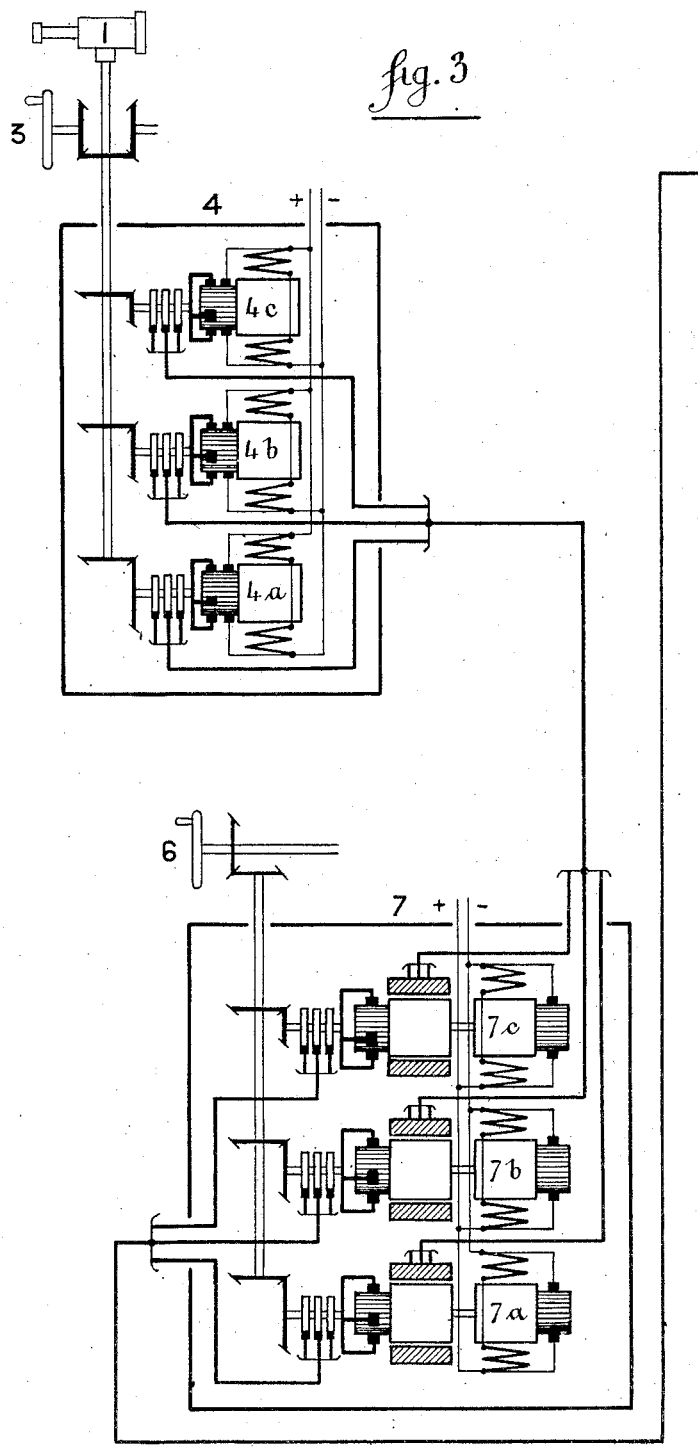

Nov. 29, 1938.  E. GRANAT  2,138,421
DISTANT ELECTRIC CONTROL SYSTEM
Filed Sept. 29, 1936    16 Sheets-Sheet 3
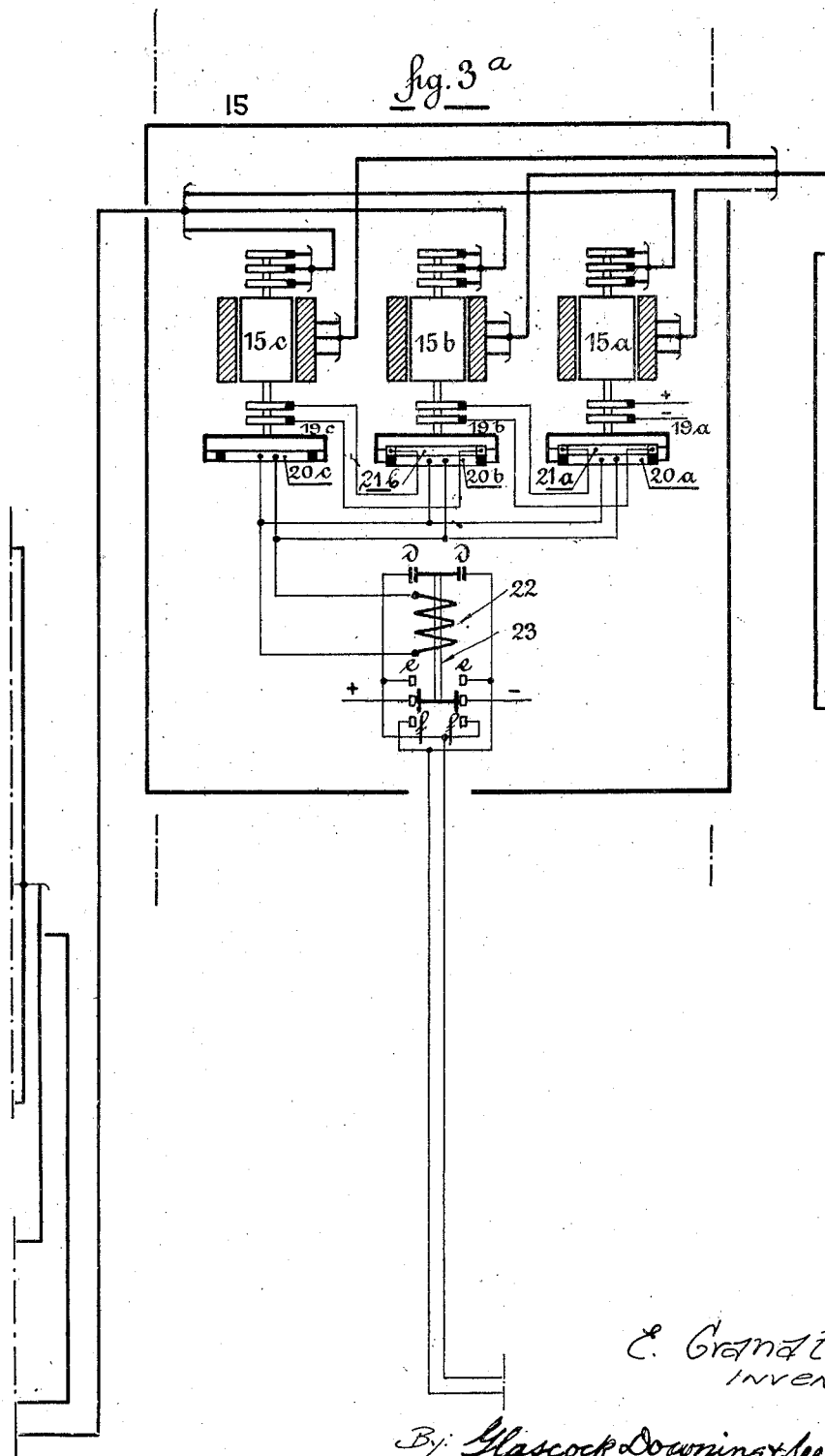

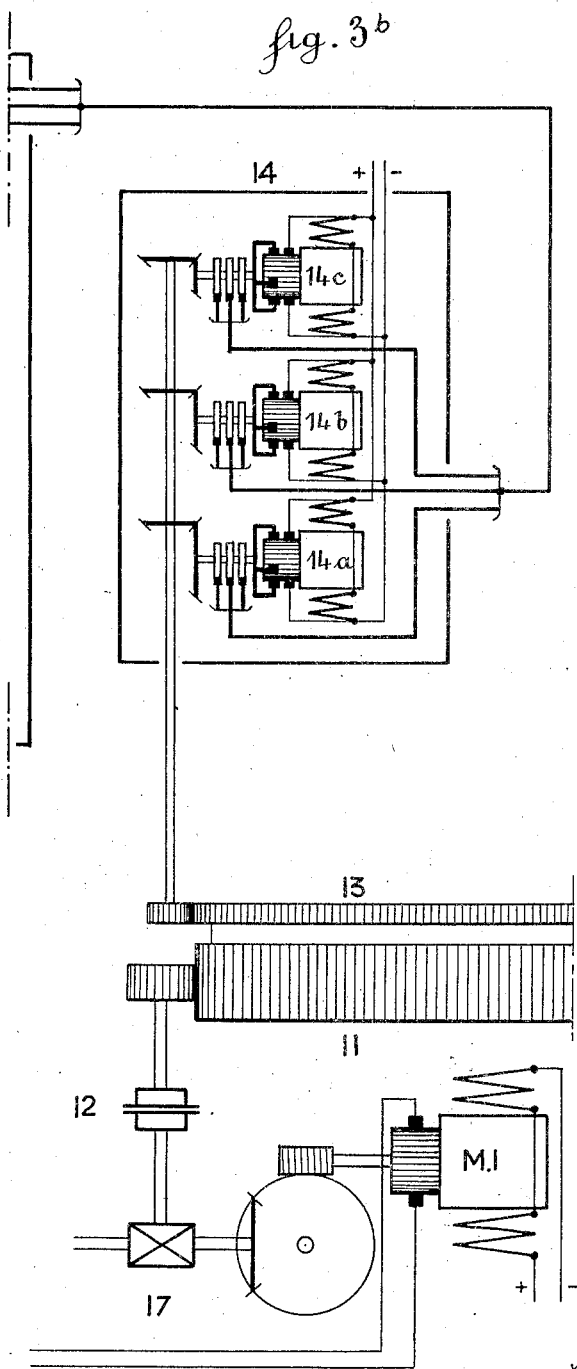

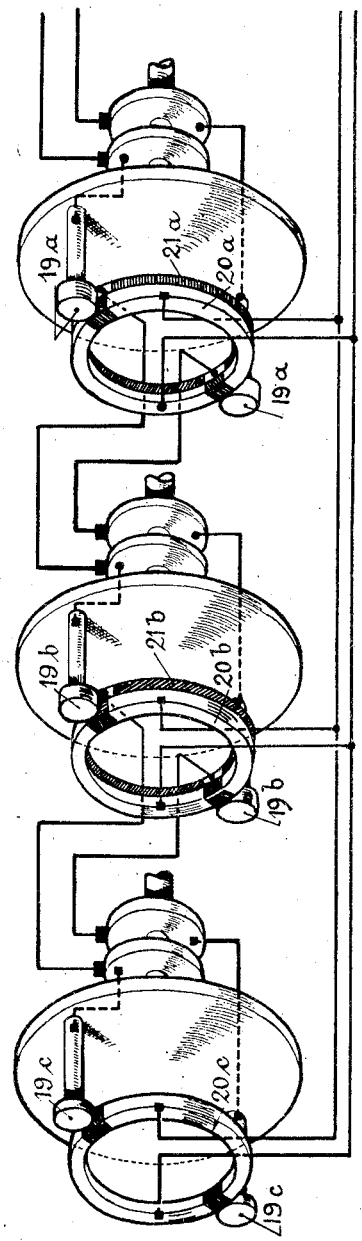

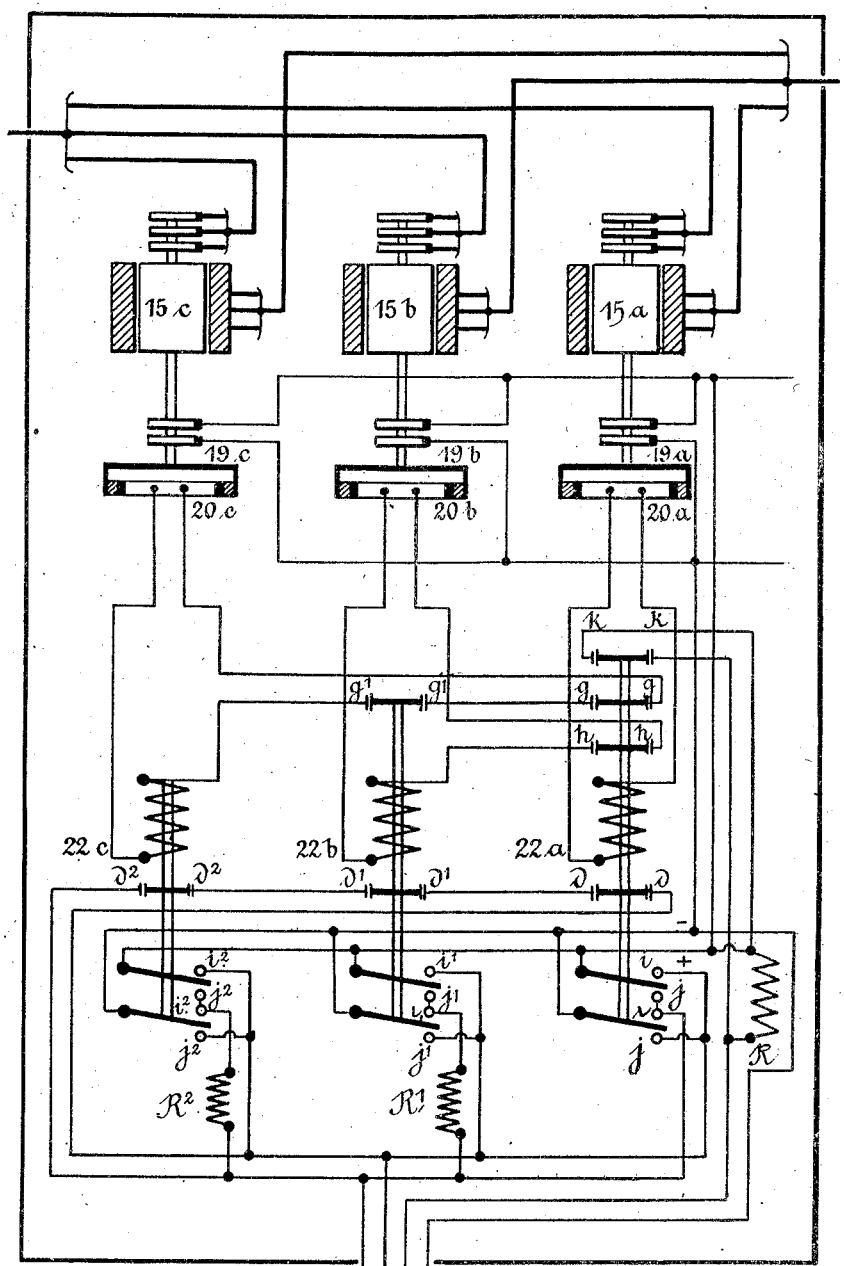

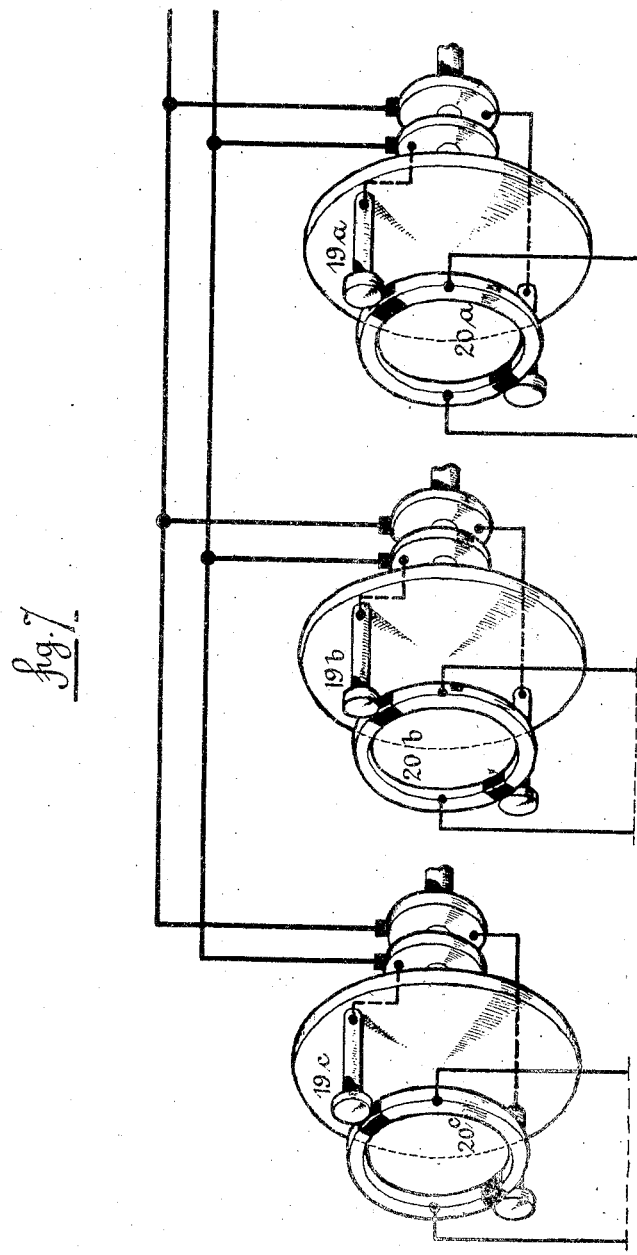

Nov. 29, 1938.  E. GRANAT  2,138,421
DISTANT ELECTRIC CONTROL SYSTEM
Filed Sept. 29, 1936   16 Sheets-Sheet 9

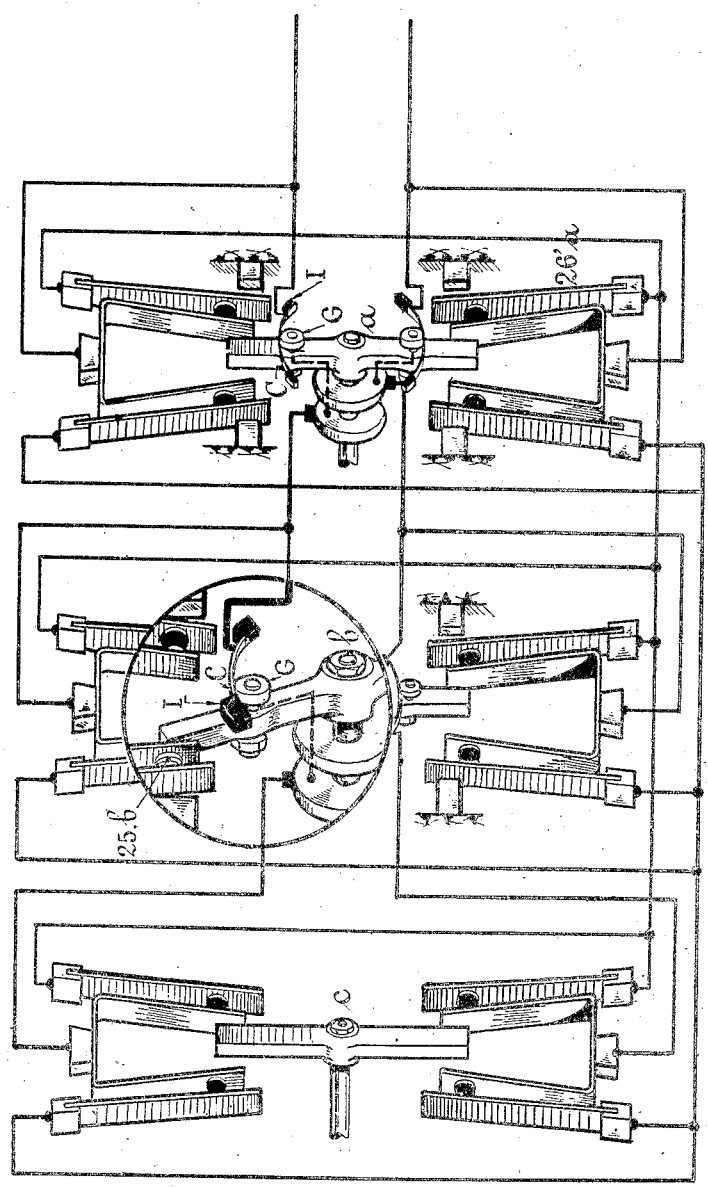

Nov. 29, 1938.  E. GRANAT  2,138,421
DISTANT ELECTRIC CONTROL SYSTEM
Filed Sept. 29, 1936  16 Sheets-Sheet 11

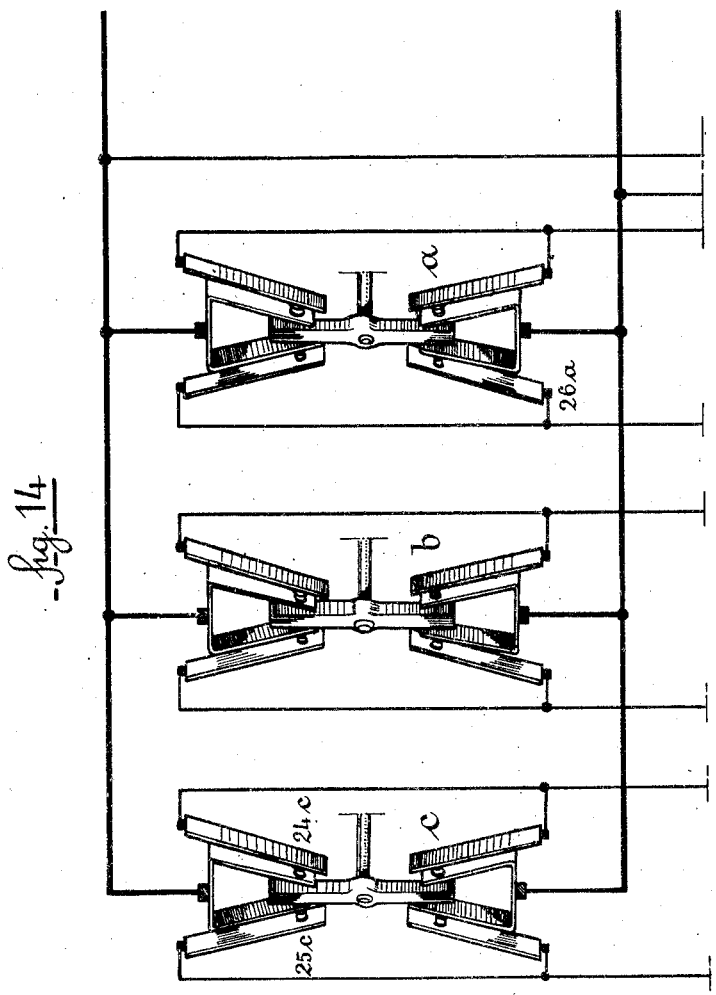

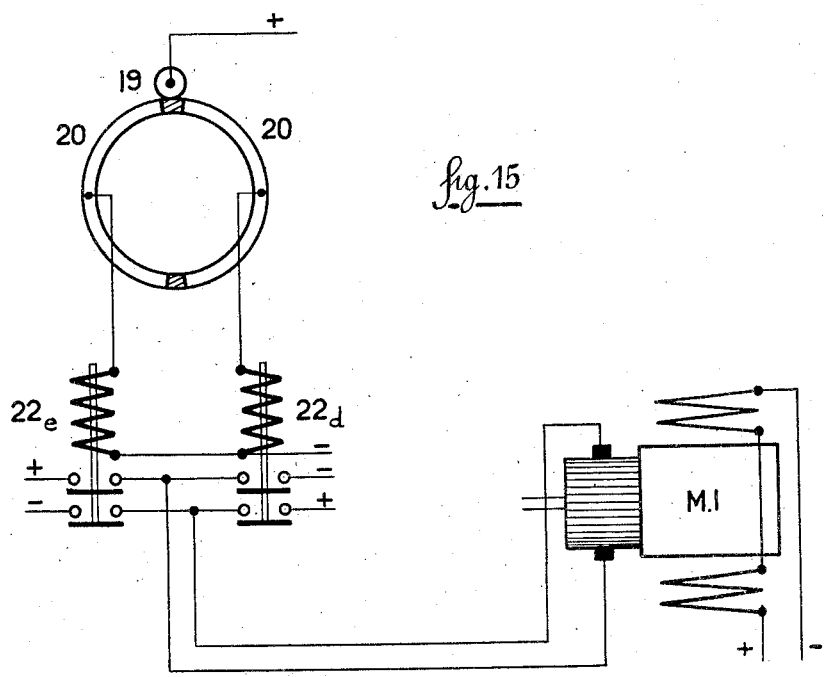
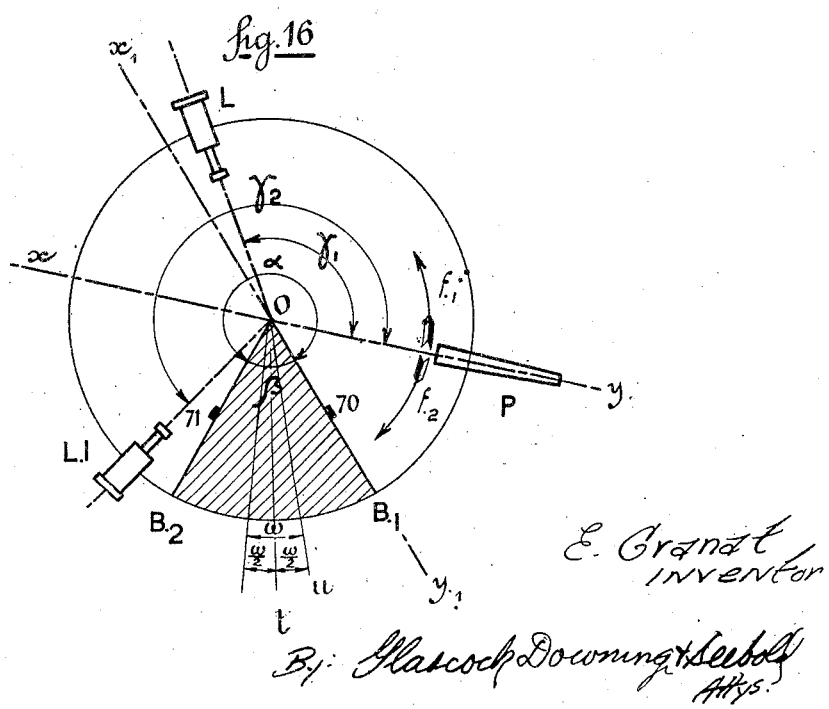

Nov. 29, 1938.   E. GRANAT   2,138,421
DISTANT ELECTRIC CONTROL SYSTEM
Filed Sept. 29, 1936   16 Sheets-Sheet 14

E. Granat
INVENTOR

By Glascock Downing & Seebold
ATT'YS.

Nov. 29, 1938.    E. GRANAT    2,138,421
DISTANT ELECTRIC CONTROL SYSTEM
Filed Sept. 29, 1936    16 Sheets-Sheet 15
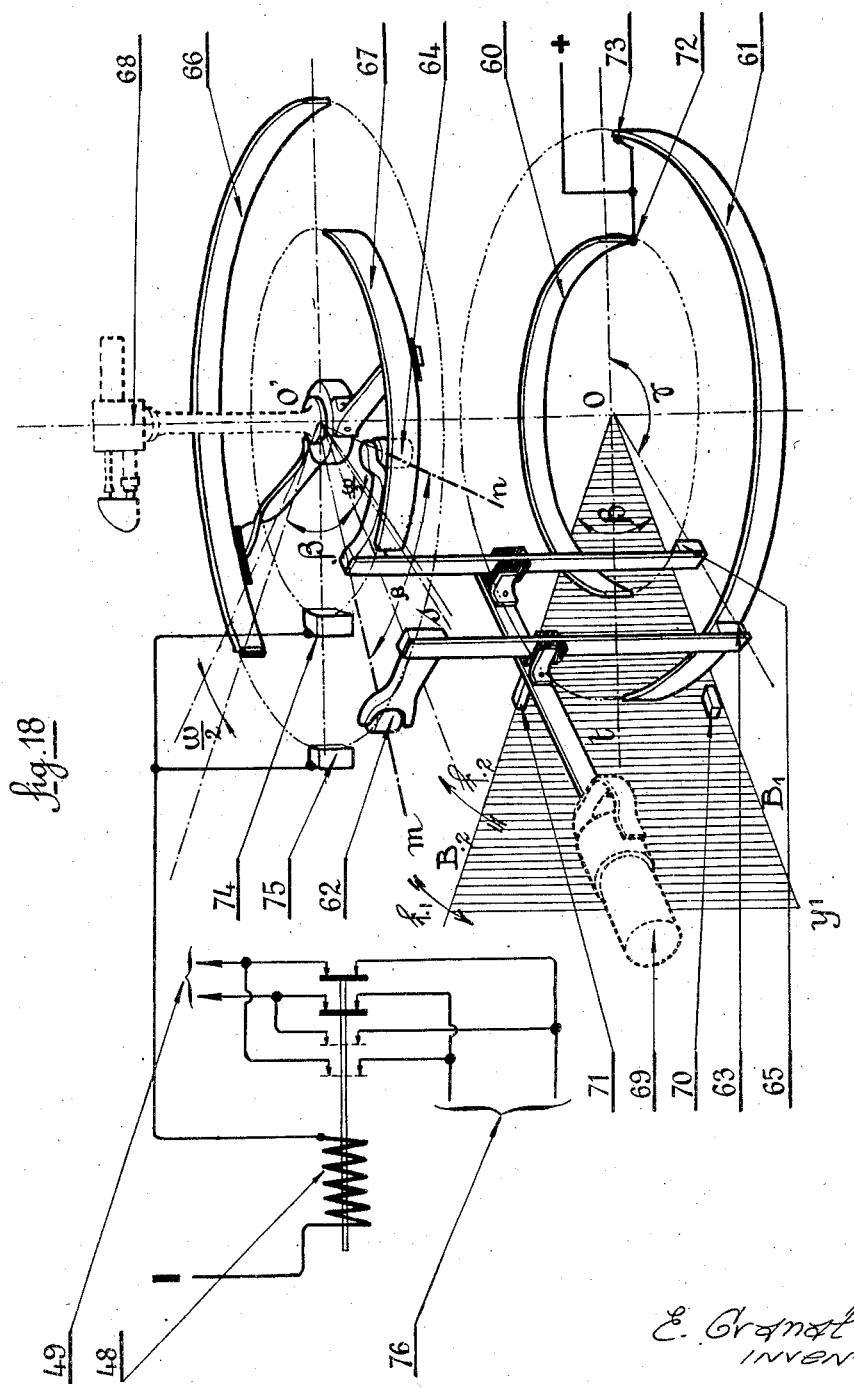

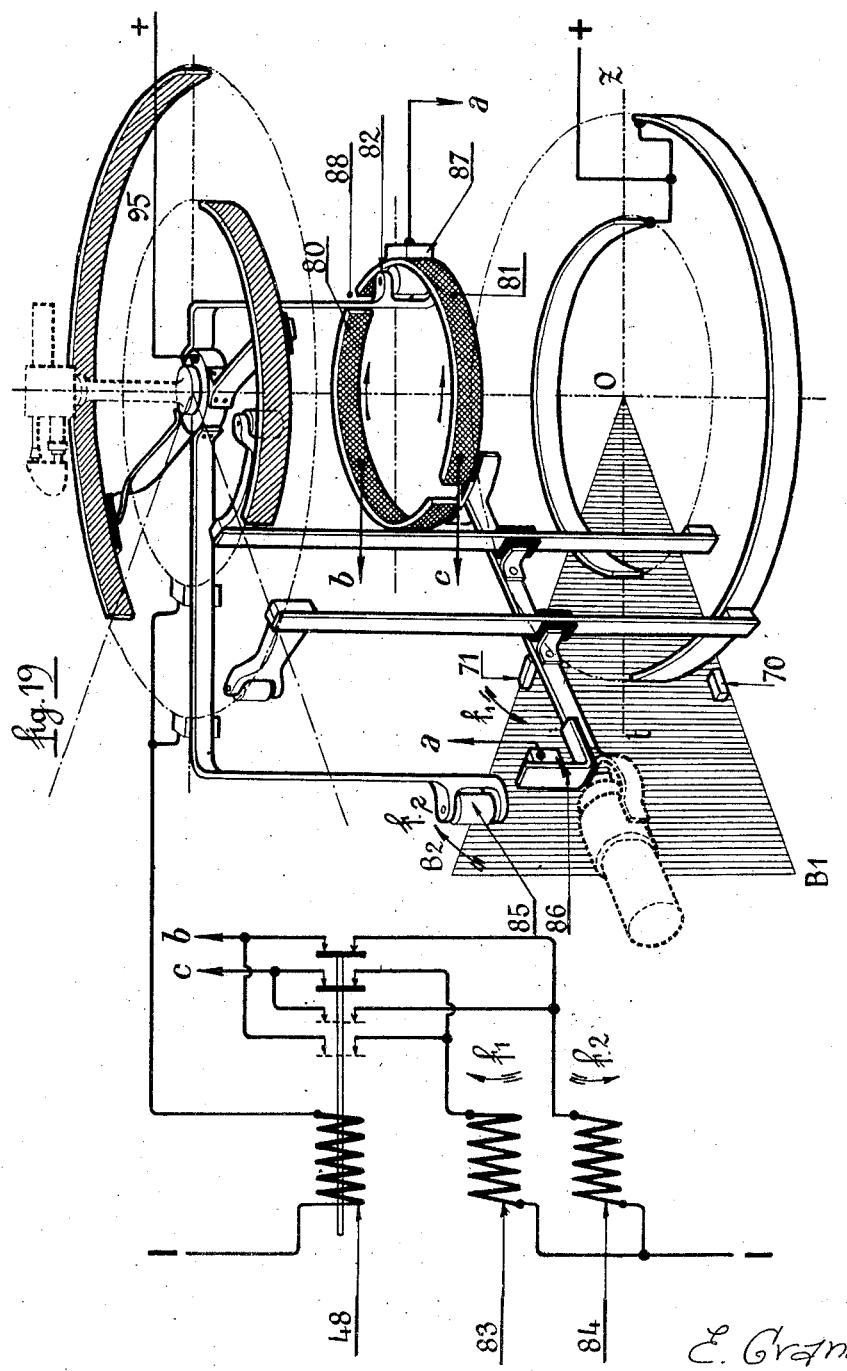

Patented Nov. 29, 1938

2,138,421

UNITED STATES PATENT OFFICE 2,138,421

DISTANT ELECTRIC CONTROL SYSTEM

Elie Granat, Paris, France, assignor of one-half to Compagnie des Forges et Acieries de la Marine et d'Homecourt, Paris, France, a company of France Application September 29, 1936, Serial No. 103,223
In France March 25, 1936

17 Claims. (Cl. 172—239)

My invention is applicable to distant electric transmissions, comprising a transmitter and one or more receivers and has for its object a device for performing automatically and as soon as operation begins the concordant setting of the transmitter and receivers with reference to each other. This device provides for the subsequent maintenance of the concordance thus established and moreover removes automatically any shifting or delay which may arise for static or kinematic reasons during operation of the distant control system.

To make the disclosure clearer, I will recall briefly hereunder certain facts relating to distant control and the manner of working in general of electric distant control systems. The transmitter at the operating station of such systems actuates a number of distant receivers the final position of which corresponds with that given out by the transmitter. In the so-called indirect control systems, the receiver enters the required final position without it being of necessity throughout operation in a position corresponding to that of the transmitter. On the contrary in the so-called direct control systems using for instance electric transmission of the synchronous type, the position of the receiver is controlled at each moment by that of the transmitter.

However for different reasons of which some are of a purely electrical nature, the receiver may show a certain delay with reference to the position it should theoretically occupy at the moment considered, said delay depending mostly on one hand on the speed of transmission and on the other on the total resistant torque of the devices controlled.

Moreover when the transmission falls out of step or when the current fails temporarily, the receiver may be considerably shifted with reference to the transmitter. This shifting may be ascertained at the transmitter station only when the receiver is provided with supervision means. The concordant setting must then be reestablished as in the case of the beginning of the transmission and this shows the drawback of requiring a complementary operation which may be effected either at the receiver or at the transmitter station.

My invention has for its object to remove the abovementioned drawbacks and to provide automatically under all circumstances for a concordant setting between the transmitter and the receiver or receivers.

The interest of the invention resides in particular in the fact that not only it ensures a concordant setting between the transmitter and the receiver at the start but also keeps up synchronism of position both at all moments and for all points. Otherwise stated it constrains at all moments the receiver to assume a position homologous with that of the transmitter. Of course in the case where the transmission performed is that of the algebraic sum of a plurality of movements, the position assumed by the receiver at any moment is that corresponding to the algebraic sum of the movements of the different transmitters at the moment considered.

My invention covers the use of receivers either of a simple or of a differential type or again of mechanical indicators, which receivers or indicators receive electrically or mechanically the movement or the sum of movements of the parts of which it is desired to transmit the position on one hand and the position of the controlled part on the other. As soon as a lack of concordance is apparent between these two positions, the concordant setting means start an auxiliary repositioning motor acting at the receiver station on an electric or mechanic differential which restores the desired concordance. When the distant control system is operative, the device acts in the same manner so as to keep up at every moment the desired concordant setting.

On the other hand, it is possible to keep up a real synchronism of position between the receiver and the transmitter or transmitters. The apparent synchronism due to a synchronous transmission may assume a temporary and variable shifting due on one hand to the torque applied to the receiver and on the other to the electric shifting of the fields rotating through windings of electric machines.

The use of the arrangements according to my invention allows also the removal of this drawback through elimination in the electric control circuits feeding the concordant setting means, of the action of the shifting in the control circuits themselves which may introduce an error in the comparison to be made. This may be obtained through the use of differential electric receivers. The positions transmitted by the controlled parts provide electric currents of same frequency in each of the windings of the receivers of the supervision system. If care is taken to have receiver windings such that their electric characteristics are identical, the shiftings which may occur in said windings under the action of the rotation of the fields will always be equal and compensate one another.

The use of a series of transmitters in one of the comparison circuits for instance, requires of course the second circuit feeding the differential receivers in a manner such that the impedance of each circuit may always be equal.

An important feature of my invention resides in its possibility of allowing the concordant setting in any case, of the controlled part with the controlling part; in particular when an angular zone is forbidden for the receivers (as in the case of a dead firing angle for ordnance) and prevents the controlled part from moving continuously as boundaries are set to its motion, the automatic concordant setting means must take into account the impossibility of performing this concordant setting through the shortest way.

Considering by way of example the case of ordnance adapted to rotate round its axis; the gun will always tend to come into concordance with the pointing glass in the direction corresponding to the shortest way i. e. over an angle less than 180°. If this angular interval comprises the dead angle through which the gun cannot pass, it is necessary that the concordant setting should be obtained in the opposite direction i. e. through an angle above 180°.

Still considering the case of ordnance, if the pointing glass enters the interval corresponding to the dead angle of one of the controlled guns, the latter must stop automatically when it arrives against one of its stops and start again automatically when the glass passes out of the interval considered.

My invention allows this problem to be solved in a very logical manner. Moreover when the pointing glass enters the interval corresponding to one of the guns which had precedently remained motionless in contact with the stop, it is possible to provide its starting in a direction opposed to that of the glass when the latter arrives near the point where it passes out of the interval considered. Thus when the glass passes out of the dead angle of the ordnance, the latter which passes away from one of its stops and rotates towards the opposite stop, may be put in its correct setting with reference to the transmitter as soon as the pointing glass has passed effectively out of the dead angle.

The moment at which the ordnance passes off one of its stops and moves towards the opposite stop so as to meet the pointing glass may be determined through adjustable means, account being taken of the speed of displacement of the gun and of tactical consideration.

Moreover my invention allows the use for the comparison means of differential receivers of the same type as those used for distant control of the guns themselves. In fact the transmissions used for this supervision comparison are provided in the same manner as in the case of the distant control means themselves. Thus one of the distant control circuits is used for the movement of maximum elongation of the transmitter and the apparatuses for concordant setting may be fed by the extant distant control mains.

I have described hereinbelow by way of example the application of the automatic concordant setting means to an amplifying synchronous distant control system. Of course, the invention may be adapted as well to any other electric, hydraulic or the like distant control system.

Moreover the example described relates to a firing system comprising a central control station, a correcting station and several receiving stations with ordnance. In this particular case my improved automatic concordance restoring means provides the following advantages:

a. The concordant setting of the different guns with the central station is effected automatically as soon as the electric circuits are closed;

b. The automatic concordance restoring means may take into account in a continuous manner the firing corrections (range, drift, parallaxis, incline of the trunnions, etc.) entering the distant control system;

c. The arrangement may comprise one or more transmitting stations which may be connected in succession with the receiver or receivers or gun or guns through mere operation of a switch controlling the electric circuits without the passage from one transmitter to the next requiring any preliminary setting in concordance;

d. Any shifting produced for any reason, such as an abnormal mechanical resistance, an angular delay due to a purely electrical cause, a failure of current or intermittent contacts, an exaggerated play in the pointing means slipping or the like will be corrected automatically;

e. The stopping at the boundaries of the firing zone is performed automatically through the stop corresponding to the end of the travel. The movement is resumed automatically as soon as the pointing instrument reenters the firing zone. The concordance restoring means allow then the gun to come automatically into a position corresponding to that of the pointing instrument.

As a modification, the gun may resume its movement before the pointing instrument reenters the firing zone, for instance as soon as it has passed through a predetermined portion of the dead angle; in this case, the gun will move against the pointing glass and meet the latter when it passes out of the dead angle.

In accompanying drawings:

Fig. 1 is the general diagram of a distant control system with automatic concordance restoring means according to invention, said system being applicable to a firing control arrangement.

Fig. 2 is a modification of this diagram.

Fig. 3 which is divided in accompanying drawings in three portions, 3, 3a, 3b shows a particular form of execution of the concordance-restoring means used in the case of Fig. 2.

Figure 5:
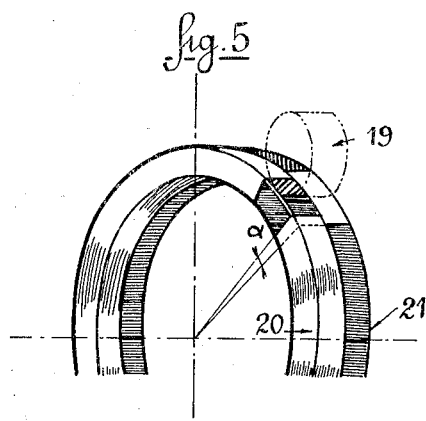

Figs. 4 and 5 show details at a larger scale.

Fig. 6 shows a modification of the same form of execution providing means for restoring concordance at varying speeds.

Fig. 7 shows a detail thereof.

Figure 8:
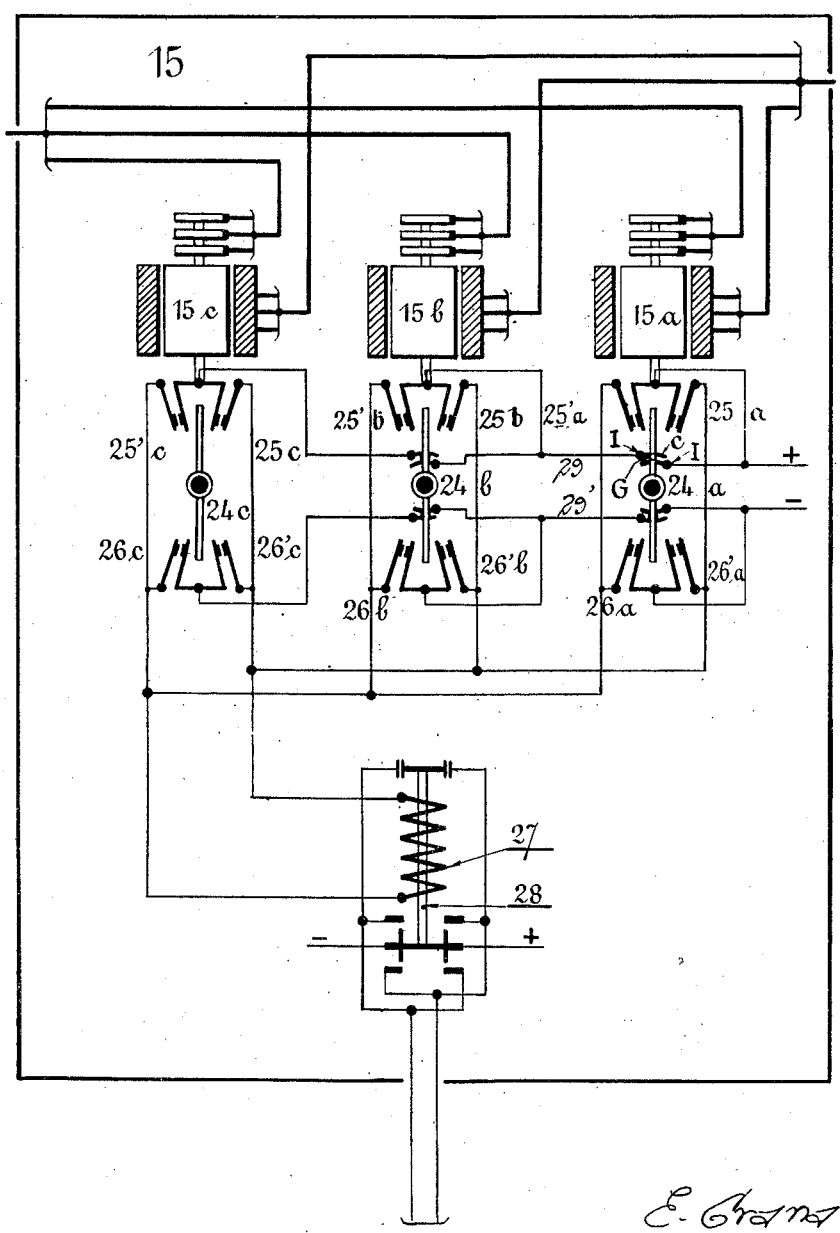
Figure 13:
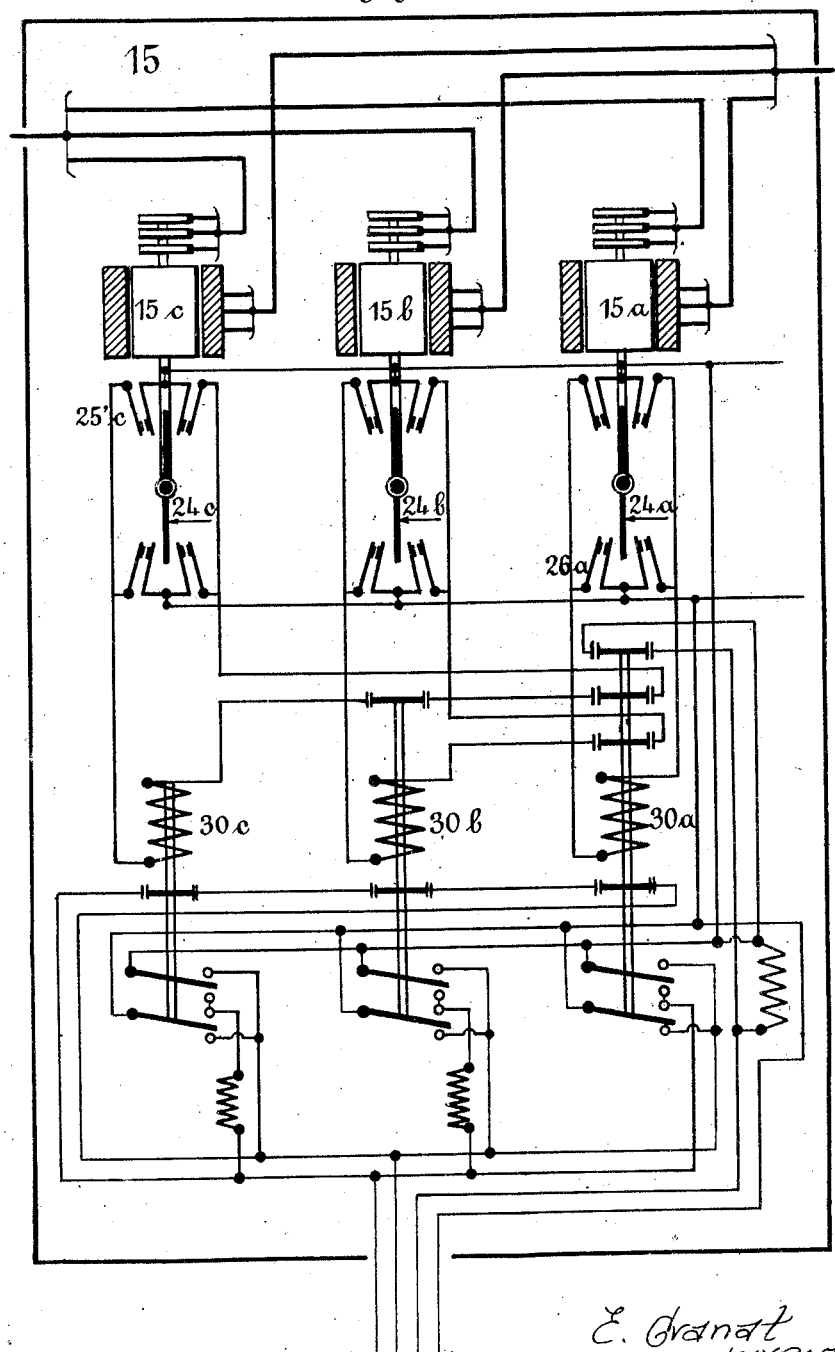

Figs. 8 and 13 relate to a form of execution similar to that of Figures 3 and 6, but the working of the receivers thereof is different.

Figs. 9, 10, 11, 12 and 14 are large-size diagrams which are intended to make the working of the parts shown in Figs. 8 and 13 appear more clearly.

Fig. 15 shows a form of execution of the reversing commutators at the receivers.

Fig. 16 is a diagram adapted to show the operation of the concordance restoring means when the field of action of the controlled part includes a dead angle.

Figure 17:
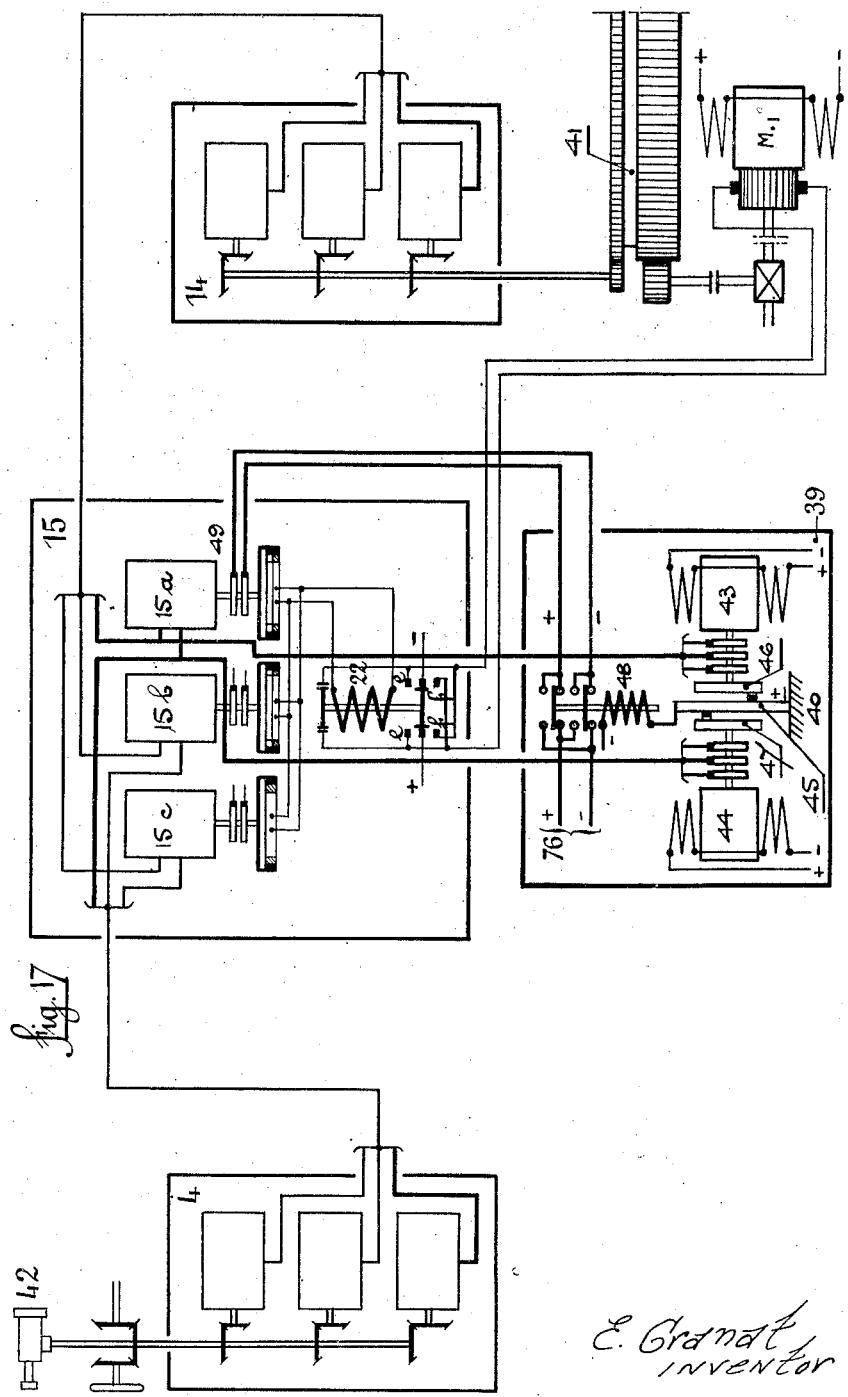

Fig. 17 illustrates an arrangement with reversing means restoring the concordant setting when the field of action of the controlled part includes a dead angle.

Fig. 18 shows the detail of the reversing means of Fig. 17.

Fig. 19 shows a modification of said reversing means.

The arrangement shown by way of example in Fig. 1 comprises two wholly independent networks:

a. The distant control system of the gun drawn in thick lines and comprising the transmitter 2 transmitting the angle of pointing of the glass 1, the auxiliary transmitter 5 adapted to add a correction to the angle transmitted, the amplifier group 8 and receivers such as 10 adapted to receive a correction for restoring concordance;

b. A system for restoring concordance, shown in thin lines and comprising the following parts.

1. A transmitter 4 transmitting the same angle of pointing as the transmitter 2;

2. A secondary differential transmitter 7 adapted to apply to the transmitted angle the same corrections as those applied by the transmitter 5 to the main distant control system;

3. A transmitter 14 transmitting the real direction of firing assumed by the gun;

4. A device 15 for restoring concordance through comparison and fed on one hand through 14 and on the other through 4 and 7, said device 15 actuating the auxiliary concordance restoring motor 16 through a relay or a suitable transmission.

There is thus provided next to the main distant control system 9 controlled by the pointing and correcting crank handles 3 and 6, a distant supervision system 15 which compares the real position of the gun transmitted by the transmitter 14 with the position desired corresponding to the sum of the pointing and correcting angles transmitted by the auxiliary transmitters 4 and 7 which rotate in unison with the main transmitters 2 and 5.

The two supervision circuits acting on the receivers 15, i. e. the circuit fed by transmitter 14 and that fed by 4 and corrected at 7 are given an equal impedance so that the comparison performed by the receivers 15 remains accurate at all frequencies. Consequently whatever errors may affect the main distant control system under the action of causes which do not act on the auxiliary supervision system, the comparison performed by the latter is always efficient. This comparison provides the correct setting of the controlled part 13, controlled by the main receiver 10 through the agency of an electromagnetic clutch 12 and of a gearwork 11. To this end, as soon as the auxiliary motor 16 begins rotating under the action of the concordance restoring means 15, i. e. as soon as the comparison between the positions transmitted to it makes a shifting in either direction of the controlled part 13 of the main distant control system appear, said auxiliary motor causes the feed brushes of the main differential receiver 10 to rotate in the desired direction through an angle such that the error in the controlled part 13 is removed.

The correcting transmitter 7 may in certain cases be omitted or else replaced by local correcting transmitters arranged near the corresponding receivers 15 on the transmitting circuits of which they are to act.

Instead of applying the concordance-restoring correction to an auxiliary motor which controls the feed brushes of the main receiver 10, it is possible as shown in Fig. 2 to apply the said correction to the mechanical transmission between the receiver 10 and the controlled part 13. To this end the transmission may comprise for instance a mechanical differential 17 the primary of which is controlled by the receiver 10 and the planet wheels of which control the controlled part 13 through the shaft 13'. The secondary of the differential introduces the concordance restoring correction transmitted by the auxiliary motor $M_1$ controlled itself by a relay $r$ actuated by the concordance restoring means 15. This motor $M_1$ may be the same as that which serves for the independent pointing of the gun.

In practice the transmitters 4, 7, 14 and the receiver 15 of the auxiliary supervision system are constituted each by a number say three, of elementary machines running at speeds which are a multiple one of the other and arranged so as to provide in succession a more and more accurate concordant setting of the main control system.

Figs. 3, 3a, 3b show a supervision system of this type constituted by treble circuits. Each transmitter 4, 7, 14 comprises three elementary transmitters controlled simultaneously by the corresponding control part (crank handle 3 of the main transmitter, correcting flywheel 6, gun 13) but with increasing reductions of speed which may for instance be equal to 1, 10 and 100.

The simple or differential transmitters and receivers need not be described in detail herein as they are known per se. It should be noted moreover that the system which forms the object of my invention would work in the same manner if the devices shown were replaced by others of a different design and constitution provided they ensure the transmission of angular movements.

Returning to the description of Fig. 3, each of the elementary transmitters 4a, 4b and 4c feeds the corresponding elementary differential transmitters 7a, 7b, 7c of the correcting transmitter 7. Similarly each of these elementary differential transmitters feeds one of the windings of the corresponding elementary differential receivers 15a, 15b, 15c forming the concordance restoring means 15 (Fig. 3a).

On the other hand, each elementary transmitter 14a, 14b, 14c of the machine 14 (Fig. 3b) transmitting the actual position of the controlled part feeds the second winding of the corresponding elementary differential receiver at 15.

As well known and with a suitable execution of the feed connections of said elementary receivers 15a, 15b, 15c, the movable part of each of said receivers will rotate through an angle the direction and magnitude of which corresponds to the difference between the sum of the rotations of the corresponding elementary transmitters of transmitters 4 and 7 and the rotation of the corresponding elementary transmitter of transmitter 14. The concordance-restoring device 15 controls as a whole the starting of the auxiliary motor $M_1$ with increasing accuracy under the successive action of the different elementary receivers 15a, 15b and 15c. To this end each of the elementary receivers drives a couple of two brushes 19a, 19b or 19c round a stationary commutator 20a, 20b or 20c provided with two large conducting segments separated by a diametrical strip of insulation (Fig. 3a).

The commutators 20a and 20b correspond to the rough and intermediary stages of concordance restoration and are disposed in contact with insulating commutator discs 21a or 21b provided with conducting portions facing the insulating portions of 20a and 20b and connected with the brushes 19b, 19c rubbing over the commutator driven by the following elementary receiver 15b, 15c. The arrangement of these brushes and commutators and their connection is shown at a larger scale in Fig. 4.

Fig. 5 shows at a still larger scale a portion of a commutator and disc arranged side by side 20, 21 and one of the brushes 19 rubbing against the superposed sides of these two commutators. Fig. 5 shows in particular the angle corresponding to the overlap of each conducting portion of the insulating disc with reference to the conducting segment of the conducting commutator, said angle of overlap preventing any stoppage in the working between the operation of two successive receivers of increasing accuracy.

When there is no shifting to be removed the elementary receivers at 15 remain in their position of equilibrium for which the brushes are in contact with the insulating strips of the commutators 20 and with the conducting portions of the adjacent insulating commutator discs 21. Consequenly the different brushes are fed in series through the agency of the latter conducting portions. The reversing switch 22 (Fig. 3a) which may be fed through any of the couples of brushes as said couple passes over the conducting segment of the corresponding commutator 20, remains now in its neutral position as the brushes 19 are all on the insulating portion of the corresponding commutator. As soon as a shifting occurs, the receivers rotate and the brushes 19a pass away from the conducting portions of the disc 21a so that only the brushes 19a on the first receiver 15a for rough resetting rotating at slow speed remain fed. The receivers 15b and 15c are temporarily without action.

According to the direction of shifting of the controlled part with reference to the transmitter part, the brushes 19a come into contact with the conducting segments of 20a on the corresponding side of the insulating strip. Consequently according to the direction of shifting, the currents passing through brushes 19a into the relay 22 cause the latter to work in a given direction, either $e$—$e$ or $f$—$f$. Simultaneously the contacts $d$—$d$ which precedently short-circuited the auxiliary motor open and the auxiliary motor starts running in the required direction until it has returned the brushes 19a on to the conducting portions of the insulating discs 21a and the insulating strips on 20a.

When the brushes have thus come into contact with these conducting portions of 21a, the gear reduction is such that the brushes 19b fed through 19a lie over the conducting portions of the commutator 20b and have still to pass over the entirety of the arc corresponding to one of the conducting segments i. e. a little less than 180° by reason of the space taken up by the insulating strip and of the thickness of the brush. Of course the brushes 19b are now in contact with the conducting segments corresponding to the prior direction of progress of the motor $M_1$. The motor continues therefore running in the same direction, as the reversing switch remains closed as previously, until it has returned the contacts 19b onto the insulating portion of 20b.

It should be noted that in order to prevent any interruption in the setting, the conducting portion of the insulating commutator disc 21a is slightly wider than the corresponding insulating strip of 20a (see Fig. 5). This complementary angle allows the next commutator 20b to be fed so that the latter begins acting in the same direction as the brushes 19a, before these have completely left the conducting segments of the commutator 20a. When the brushes 19b come into contact with the conducting portions of 21b the same cycle of operations begins over again for the distributors 20c with the difference, however, that in the example chosen, this is now the last stage of the setting in concordance; therefore this commutator 21 opens the circuit of the relay 22 and causes the motor $M_1$ to stop as soon as the brushes 19c have returned on to the insulating strip. Obviously I may use any number of stages which may be chosen according to the accuracy provided through one revolution by the transmissions used and to the accuracy required for the restoration of concordance. This accuracy increases at each stage as one revolution of a given commutator corresponds to a displacement of the controlled part which is smaller for commutators of further stages.

In the modification illustrated in Fig. 6, each device $a$, $b$, $c$ is provided with its own relay which starts the auxiliary motor at decreasing speeds for stages of increasing accuracy. In this case the distributors 21 are omitted and the brushes 19 are fed in parallel. Fig. 7 shows in detail the commutators illustrated in Fig. 6.

As soon as the brushes pass out of the neutral position corresponding to zero shifting, they feed the corresponding reversing switch 22a, 22b, 22c. The closing of the circuit of 22b opens the circuit feeding 22c at $g_1$—$g_1$ and the closing of the circuit of 22a opens that of 22b at $h$—$h$ and that of 22c at $g$—$g$. It is apparent that the three reversing switches open the short circuit of the motor $M_1$ respectively at $d$—$d$, $d_1$—$d_1$ and $d_2$—$d_2$. When the reversing switch 22a is fed, which prevents the others from being fed, it closes the circuit of the rotor of $M_1$ at $i$—$i$ or at $j$—$j$ over the main in the direction corresponding to the rotation of the brushes 19a while it opens at $k$—$k$ the short circuit of the resistance R inserted in the circuit of the stator of $M_1$. Consequently the auxiliary motor $M_1$ begins rotating in the desired direction at high speed until the brushes 19a have been returned on their insulating strips. At this moment the reversing switch 22a is no longer excited and allows the working of the reversing switch 22b the circuit of which is now closed at $h$—$h$. This reversing switch opens the short-circuit of the rotor of $M_1$ at $d_1$—$d_1$ and closes its feed circuit at $i_1$—$i_1$ or $j_1$—$j_1$ according to the direction of shifting over the small resistance $R_1$. The resistance R of the stator circuit being now short-circuited again, the speed at which the motor $M_1$ performs the concordant setting of the receivers becomes smaller. The control of this concordant setting passes then under similar conditions to the arrangement at $c$ which performs the final setting at slow speed through insertion into the circuit of the rotor $M_1$ of a suitable resistance $R_2$.

Obviously any other means may be provided for reducing the speed of the resetting motor $M_1$; in particular instead of acting through resistances in series with the feed circuit of the motor as in the case of the figure, these resistances may be in series only with the rotor armature or else the relays may connect the motor with sources of potential of different values etc.

As in the case of Fig. 5, the travel to be exexcuted by the rollers 19b when they begin operating is equal to less than a half-revolution of the commutator 20b and at the moment considered they are obviously in contact with parts of polarities corresponding to the continuation of the movement in the direction initiated by the commutator precedently in action.

In the form of execution of Figures 8 and 9, the brushes 19 of the precedent figures are replaced by a pivoting armature 24 adapted to close to the right and to the left of its position of equilibrium stop contacts 25—26 or 25'—26' which ensure, according to the angular direction of the armature, the closing of the exciting winding 27 of the reversing switch 28 in one direction or another. If the reversing switch is supposed to be common to the different groups of stop contacts mounted in parallel, the device shown provides electrically the same results as that shown in Figs. 3 and 4 with the difference however that the differential receivers do not rotate through an entire revolution but only through an angle of limited elongation, which provide results identical with those provided by the brushes 19 of Figs. 3 and 4.

Figure 10:
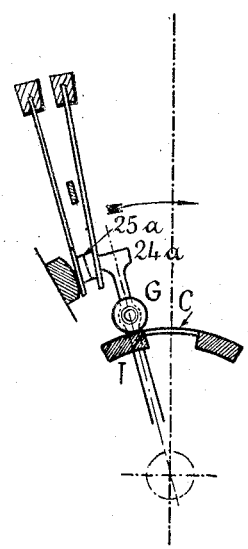
Figure 11:
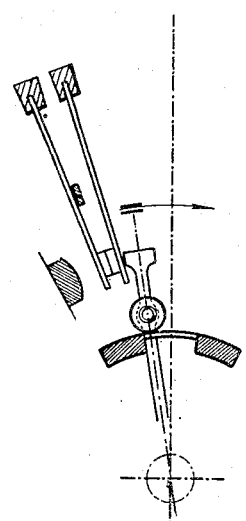
Figure 12:
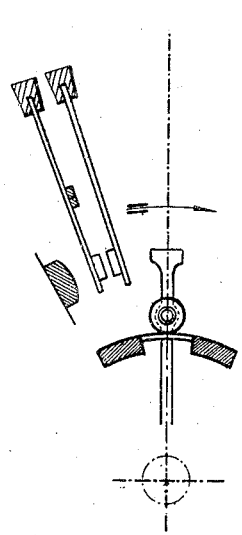

The working of the three groups of stop contacts of same direction 25—26 or 25'—26' is performed in succession from a to c in the same manner as for the brushes of Fig. 3. This working appears from mere inspection of the detail Figure 9. At the beginning of the shifting the armature 24a bearing against 25a and 26a causes the reversing switch 27 to be fed and the auxiliary motor to be started while it opens at the same time at 29—29' the circuit feeding the stop contacts of the arrangement at b. The latter are operative in their turn with a greater accuracy when the armature 24a has returned into its neutral position and the concordant setting is finished as in the case of Fig. 3 by the arrangement c, the working of the reversing switch 28 being altogether similar to that of the reversing switch of Fig. 3. Figs. 10 to 12 show the successive stages of operation of an armature of the system shown in Figs. 8 to 9. Fig. 10 shows the maximum shifting of the armature closing the contacts 25a which makes the roller G carried by the armature pass over an insulating part I so as to break the circuit feeding the stop contacts of the following arrangement corresponding to greater accuracy of operation. When performing its concordance restoring rotation the corresponding elementary receiver returns the armature considered to its position of equilibrium. Before this occurs and even before the contact 25a (Fig. 11) opens which makes the current pass into the next arrangement b, the roller G has returned over its conductive guide-piece C which thus begins being operative again before the arrangement a has ceased being operative. Fig. 12 shows the armature 24a when it has returned to its position of equilibrium for which the contact 25a is open while the roller G allows the feeding of the contact arrangements b and c.

In brief the system shown in Figs. 8 and 9, instead of making use of the rotation of the receiver motor 15 makes use only of the torque of this motor which has a tendency, according to the position assumed theoretically by the rotary field in the receiver rotor, to move first for instance towards the left during a first rotation of the field through 180° and then towards the right during a second rotation through 180° following the first rotation. Consequently during an entire revolution of the receiver motor, the movable armature bears against the left hand contacts during a rotation of the transmitter substantially equal to 180° and against the right hand contacts during the following 180°. Consequently the result obtained is absolutely comparable to that of the two part annular contacts 20 of the distributors of Fig. 4.

It is possible to apply to the diagram of Fig. 8 the same modifications as those brought to Fig. 6 with a view to reducing gradually the speed of return to concordance. Fig. 13 shows the multiple reversing switches used to this end and which are connected and mounted in the same manner as in Fig. 6. As apparent in Figs. 13 and 14, the armatures are no longer fed in series and the stop contacts mounted in parallel feed each a corresponding reversing switch and each reversing switch opens the circuit of the following reversing switches as in the case of Fig. 6. Except for this arrangement, the working of the stop contacts is the same as in Fig. 8 and the operation of the reversing switches 30 energized in succession by the top contacts a, b, c, is exactly similar to the operation of Fig. 6 so that it is not necessary to proceed with any further description.

The preceding figures show a concordance restoring device provided with a series of distributors 20 or of contacts 25 always adapted to work as by directional switches. More particularly with reference to Fig. 7, each stage of the concordance restoring device shows a series of distributors each provided with two semi-annular contacts 20 over which two cooperating brushes 19 are adapted to move. It is also possible to provide a similar arrangement with unidirectional switches, i. e. with only one current-feeding brush; in this case, the brush connected permanently with one of the terminals of the main feeds according to the direction of shifting, one of the two distributor-contacts which provide as in the precedent case the starting of the auxiliary motor in the desired direction. By way of example, Fig. 15 shows diagrammatically a form of execution of this device. The roller 19 driven by the receiver motor moves round the distributor carrying two conducting semi-annular contact pieces 20. According as to which piece is fed, the corresponding relay 22d or 22e is energized and caused by way of consequence the starting of the auxiliary concordance restoring motor $M_1$ in the proper direction.

All the above described systems for electrically locking the different arrangements and for ensuring the modifications of speed required in accordance with increasing accuracy are also applicable to this form of execution. Of course it is possible to provide any number of stages as in the precedent case by means of similar connections; the only modification would be that the single relay 22 of Fig. 3 or the multiple relays 22a, 22b and 22c of Fig. 6 which were of the polarized type should now be replaced by a system of two relays 22d and 22e adapted to work in alternation; such couples of relays may moreover be locked electrically or else mechanically by means of a balance whereby the operation of the arrangement comprising a unidirectionally fed distributor as shown in Fig. 15 is exactly similar to those described in the preceding figures.

For all the arrangements described hereinabove, it should be understood that the contact which short-circuits the concordance restoring motor for electrically braking same may be controlled through an electromagnet fed through the contacts provided for the electrical braking; similarly the contacts which control the insertion of resistances for modifying the speed of concordance restoring may be controlled through the relays independent of relays 22.

The above described concordance-restoring systems shown in the precedent figures make use of differential receivers 15a, 15b and 15c to which are applied electrically two movements to be compared: the first from the controlling part and the second from the controlled part. If the circuits feeding each element of the differential receiver have the same electrical data, the delays due to an electric origin in the differential receivers are therefore eliminated as they act in equal and opposite manners on the two transmissions leading to the receiver; the restoration of concordance is thus effected with a very great accuracy even during the periods of movement.

In the case where the concordance restoring motion of the distant control system should be performed when the latter is at a standstill or else in the case where it is desired to merely correctly direct a part at a distance in accordance with the position sent out by the transmitter, no shifting in the receivers of the concordance restoring system, considered per se, is to be feared and it is possible to simplify the device by replacing the differential receivers 15a, 15b, 15c by simple receivers. But in this case the concordance restoring device should be arranged in the vicinity of the controlling or of the controlled station so that the position of either station may be introduced mechanically in the apparatus. The concordance-restoring means would then provide the comparison between the position of one of the stations transmitted electrically and the position of the other station transmitted mechanically. This comparison may be effected by means of the device shown in Fig. 3 in which for instance a mechanical differential gear would be interposed between each of the simple receivers and the mechanical control provided by one of the two interconnected stations, the planet pinions of the differential gear controlling the brushes 19a, 19b, 19c. It is also possible to drive the distributors 20a, 20b and 20c through the mechanical control disclosed, whereby the relative motion of the brushes 19 and the distributors 20 would remain the same as in the case of Fig. 3.

The arrangements described with reference to the preceding figures may be used without any special care as long as in the arrangement comprising a plurality of concordance restoring stages, the angular size of each conducting segment corresponds for the slowest stage to the total amplitude of the movement to be transmitted. Now, in the case of an adaptation of the arrangement to existing apparatuses such as distant pointing apparatuses, the slowest receiver generally makes a complete revolution for the total amplitude to be transmitted so as to obtain the maximum accuracy possible. My invention allows the above described concordance restoring arrangement to be used even in this particular case.

By way of example, I will suppose for sake of a clearer disclosure, that the distant control is used for controlling ordnance the displacements of which are homologous of those of a pointing glass; I will suppose, also for greater simplicity, that no correction is introduced into the distant control system, the operation being exactly similar in the case when it is required to introduce corrections into the system.

Referring to diagrammatical Fig. 16, $\alpha$ is the angular opening of the firing field of the ordnance P rotating round O and $\beta$ is the dead angle of the same.

The pointing glass L may move throughout both angles $\alpha$ and $\beta$.

Considering the diameter $xy$ passing through the axis of the ordnance at a given moment, the concordance restoring arrangement established according to any of the above described modifications, will have a tendency to return the ordnance into concordance with the pointing glass through the shortest angle. Supposing this glass is at L, the angle $\gamma_1$ of concordance is smaller than 180° and the ordnance will start in the direction of the arrow $f_1$ corresponding to normal operation of the concordance restoring arrangement; on the contrary, if the glass were at $L_1$ spaced from the ordnance by an angle $\gamma_2$ greater than 180° when measured inside the firing field, the concordance will be performed through the shortest path i. e. in the direction of the arrow $f_2$. The ordnance will thus come against the stop $OB_1$, which would render concordance impossible. Concordance would then be restored only when the glass has returned to the right of line $Ox_1$ i. e. when it is spaced from the ordnance by an angle smaller than 180° inside the firing field. I may remove this drawback and allow automatic concordance in all cases without taking any particular care (Fig. 17).

The system used in such a case comprises the auxiliary parts shown in Fig. 17 and adapted to compare the relative positions of the ordnance, glass and dead firing angle. According to the respective positions of said ordnance, glass and firing angle, the return to concordance is or is not possible through the shortest path and the arrangement consequently provides either normal operation of the relay 22 controlling the concordance restoring motor $M_1$ or on the contrary a reversal of the feed of the relay; in other words if, as in the case shown in Fig. 16, the glass is at L, the relays work in their normal manner and if it is at $L_1$ the feed of the relay 22 and consequently that of the motor $M_1$ is reversed so that the restoration of concordance is always effected in the direction through which it is possible i. e. in the case considered in the direction of the arrow $f_1$.

The device considered needs only to act on the slowest circuit used for the first approximate operation as obviously the other circuits of increased accuracy are operative only when the restoration of concordance is substantially performed, at which moment the glass and the ordnance are always spaced by less than 180°.

The principle of this device shown as a whole at 39 (Fig. 17) is as follows: On the stationary structure shown diagrammatically at 40, are separately reproduced the movements of the ordnance 41 and of the glass 42 by means of synchronous position repeating motors 43 and 44 controlled by the movement of the ordnance and of the glass respectively. A contact system carried by the stationary structure 40 is arranged therefore in conformity with the dead angle of the gun and two other, movable, contact and slide systems controlled respectively by the motors controlled by the glass and the gun move in front of the former, stationary system; according to the relative position of these three contact systems, the relay 48 is fed or not fed. This relay reverses the working of the relay 22 of the concordance restoring system and consequently the concordance restoring motor M₁ moves in its normal or in its reverse direction according to the direction of operation of the relay 48.

Otherwise stated, if the angle separating the gun and the glass, measured inside the firing field is less than 180°, the relay 48 does not modify the polarity of the feed through 49 of the contacts of the concordance restoring device 15. If on the contrary the angle separating the gun and glass directions, measured inside the firing zone is above 180°, the normal direction of rotation of the motor M₁ providing the restoration of concordance should be reversed so that the concordance may still be restored inside the zone of firing. To this end, the relay 48 is operative and reverses the feed at the terminals 49 of the concordance restoring means.

Fig. 18 is a detail view of a form of execution shown by way of example of the contacts of the system 39. This system comprises as stated above three parts; the first is constituted by two half annular stationary parts 60—61 forming the stationary portion of the arrangement. The receiver 43 of Fig. 17 controls the contact systems 62—63 and 64—65; the receiver 43 giving out the position of the gun, these contact systems move in conformity with the direction of the gun. The receiver 44 which gives out the position of the glass controls the direction of the double, movable, part annular system 66—67.

Obviously the contacts and brushes instead of being controlled by the position indicating receivers 43—44 may be controlled in a similar manner by any other electrical or mechanical means. For this reason, I have shown in dot and dash lines in Fig. 18 the glass 68 and the gun 69, the connections being shown as being mechanical so as to make the disclosure simpler. The following description, wherein the gun and glass are supposed to be connected directly to the annular contacts and brushes, is applicable without modification to the case where the control is performed through the agency of the receivers 43 and 44.

The dead angle is shown at β the mechanical stops of the gun being shown at 70 and 71.

The stationary annular parts 60 and 61 correspond practically each to half the field of the glass, i. e. in the case considered to 180°. On the contrary, the parts 66 and 67 are angularly reduced each by an amount corresponding to one half of the dead angle; the contact rollers 62—63—64—65 controlled by the gun are adapted to rub respectively over the annular parts 66, 61, 67 and 60.

On the other hand, an electric connection is provided between the rollers 62 and 63 and between the rollers 64 and 65; moreover the angle formed by the radii passing through the rollers 62 and 64 is equal to the dead angle i. e. to β.

Lastly the ends 72 and 73 of the rings 60 and 61 are connected with one of the poles of the source for instance as shown on the figure, to the positive pole. In the example of the figure the gun and the glass are separated by an angle γ smaller than 180°; thus in this case the relay 22 of Fig. 17 works in its normal position under the action of the concordance restoring means 15.

Mere inspection of Fig. 18 shows the feed of the reversing relay 48 is not possible in this case; this reversing relay is inoperative and the concordance restoring means are operative in the normal manner. The same is the case each time the angle between the glass and the gun measured inside the firing zone of the gun is smaller than 180°, which is due to purely geometric reasons provided by the very arrangement of the contacts.

On the contrary, if this angle is above 180°, one of the brushes 74 or 75 is fed which causes the relay 48 to be operative; this consequently reverses the current from the source 76 whereby the voltage at the terminals 49 of the concordance restoring means is reversed; the relay 22 works then in a manner reverse to normal as defined by the direction given out by the concordance restoring means 15 and the gun will thus return to concordance with the glass without entering the dead angle, by passing through the longer way above 180°.

When the position at 180° is reached, the relay 48 ceases being fed for the reasons given above and consequently the polarity at the terminals 49 is reversed again; but at this moment the contacts controlled by the first or highest speed receiver 15a are reversed so that the relay 22 remains in the same position and concordance continues to be restored in the normal direction until the motor M₁ has returned the part 41 into concordance with the glass 42; the concordance restoring means operate with the different stages of accuracy described hereinabove.

The above disclosure shows the arrangement of Fig. 18 is inoperative as long as concordance can be restored in the normal direction; if on the contrary the dead angle of the gun prevents concordance through the shortest path, a reversal in the concordance restoring means is provided through the relay 48 and concordance is restored through the longest path; however as soon as the angle between the gun and the glass is equal to 180°, the arrangement of Fig. 18 ceases operation and the concordance restoring means 15 operate again in normal direction.

It has been stated hereinabove that the complementary arrangement of Fig. 18 acts only on the slow moving receiver circuit providing the primary concordance setting of minor accuracy. As the control of this device requires movements homologous of those of the gun and of the glass, it may be of interest in certain cases to form into one this slowest moving receiver and the arrangement of Fig. 18. Reverting to Fig. 17, it is sufficient to replace the differential receiver 15a of the concordance restoring device of said Fig. 17 by the two simple receivers 43 and 44 of the device 39 which controls the direction of motion. Under such conditions, this latter device 39 plays also the part of the system controlling the slowest moving receiver and it comprises to this end the brushes and commutators or distributors normally actuated by the receiver 15a. Fig. 19 shows an arrangement of this type. It is intended to replace in the concordance restoring means 15, the slowest moving receiver 15a together with its brushes and contacts. This apparatus is designed in a manner similar to Fig. 18 and comprises moreover ring portions 80 and 81 and a brush 82 moving respectively with the gun and with the glass.

This form of execution corresponds to the case of Fig. 15 wherein the system works as a unipolar system by means of two relays shown on Fig. 19 at 83 and 84 and providing each one of the directions of motion of the concordance restoring motor M.

Mere inspection of the figure shows that, by reason of the feed of the relays 83 and 84 through the rings 80 and 81, the working corresponds to that of the concordance restoring means of Fig. 15. However if for the reasons disclosed in the description of Fig. 18, the relay 48 is operative, the feed circuits of the relays 83 and 84 are interchanged and concordance is restored in the opposite direction.

The arrangement shown comprises moreover a complementary movable contact 85 moving synchronously with the glass and arranged at 180° of the contact 82.

The brush 85 may come into contact with the contact 86 moving integrally with the gun and connected electrically with the stationary contact 87. This latter contact is arranged on the axis OZ of the dead angle.

The contacts 85 and 87 operate as follows: when the roller or brush 82 is opposite the gap 88, the rings 80 and 81 cease being fed and consequently neither of the two relays 83 and 84 is fed whereby the concordance restoring means is brought to a standstill. To allow this particular position to be passed through, the brush 85 connected with the mains through the lead 95 comes into contact with the contact 86 electrically connected with the contact 87 feeding one of the rings 80 or 81 so as to energize one of the relays 83 or 84 of the concordance restoring means.

This arrangement allows moreover the provision inside the dead angle of a predetermined adjustable zone inside which the glass may move without making the gun move, the gun remaining constantly against one of its stops. This arrangement shows the following advantage apparent from inspection of Figs. 16 and 18. If the glass moving in the direction of the arrow $f_1$ passes beyond the radius $OB_2$, the gun remains stationary along direction $OB_2$ under the action of the stop 71 which opens the circuit corresponding to the progress in the direction of the arrow $f_1$ and prepares the closing of the circuit corresponding to the movement of the gun in the opposite direction.

By reason of the relative positioning of the annular parts 66 and 67 mechanically or otherwise connected with the glass 68, with reference to the rollers 62 and 64 connected with the gun, the electrical reversing motion provided by this arrangement will be completed as soon as the glass reaches in the dead angle the bisecting radius $Ot$ as apparent from inspection of Fig. 18. The gun will then start in the direction of the arrow $f_2$ so as to meet the glass. If the latter does not pass out of the dead angle, the gun will again abut against its other stop 70 and the same operations are resumed; to wit, each time the glass passes through the bisecting radius $Ot$, the gun will leave the stop against which it abuts so as to move towards the glass.

In practice this device may work correctly, provided the displacement of the glass is continuous and in particular there are no extensive oscillations of the glass to either side of the line $Ot$, which would produce a continuous movement of the gun between its two stops.

To remove this drawback I provide a neutral zone shown by the angular zone $w$ in Fig. 16. If the ends of the rings 66—67 are reduced by an angular amount equal to $$\frac{w}{2}$$

the contacting of the rollers 62 and 64 with the rings 66 and 67 is delayed by a corresponding amount on either side; consequently the glass may move inside this angle without the gun held against one of its stops having a tendency to move towards the opposite stop. It is only when the glass passes out of the total angular zone $w$ in the direction opposed to the gun that the latter resumes its reverse motion so as to meet the glass at the opposite stop.

In other words, referring to Fig. 16, if the gun is against its stop 71, when the glass has passed through the radius $ou$, the gun will resume its motion in the direction of the arrow $f_2$. The angle $w$ is chosen, due account being taken of tactical considerations, of the speed of displacement of the gun etc.

The electric stops shown in Figs. 16, 18 and 19 are in principle controlled by the gun itself, but they could obviously be placed at distance on the reversing means 39.

What I claim is:

1. A distant electric transmission comprising a main transmitter, at least one receiver electrically controlled thereby, an auxiliary transmitter an auxiliary electric transmission of angular motion controlled by said auxiliary transmitter, means controlling both transmitters, a part controlled by each receiver, a second auxiliary transmission of angular motion controlled by said part, differential means submitted to the action of the two auxiliary electric transmissions and an auxiliary electric motor system controlled by said differential means and acting on the part controlled by the corresponding receiver for restoring concordance between said part and the transmitter.

2. A distant electric transmission of angular movements comprising a main transmitter, at least one main receiver, an at least partly electric transmission fed by the transmitter and controlling the receiver, an auxiliary transmitter, means controlling both transmitters, a part controlled by each receiver, a second auxiliary transmitter controlled by said part, a differential receiver, electric circuits of equal impedances controlled respectively by the two auxiliary transmitters and feeding the differential receiver, an auxiliary electric motor system controlled by said differential receiver and means whereby said system acts on the transmission controlling the main receiver for restoring coincidence between said part controlled by the receiver and the main transmitter.

3. A distant electric transmission of angular movements comprising a main transmitter, at least one main receiver, an at least partly electric transmission fed by the transmitter and controlling the receiver, means controlling the transmitter, an auxiliary transmitter system including a plurality of elementary transmitters controlled at different staged speeds by the means controlling the first transmitter, a part controlled by each receiver, a second auxiliary transmitter system also including a plurality of elementary transmitters controlled at speeds corresponding to those of the first plurality of elementary transmitters, by said part, a differential receiver system including a plurality of elementary differential receivers, couples of electric circuits of equal impedances controlled respectively by the corresponding elementary transmitters of the two auxiliary transmitter systems and controlling the corresponding elementary differential receiver, an auxiliary electric motor system controlled in succession by the elementary differential receivers and means whereby said auxiliary motor system acts on the transmission controlling the main receiver for restoring concordance between said part controlled by the main receiver and the main transmitter with an accuracy increasing with the successive differential receivers operating.

4. In a transmission as claimed in claim 2 the provision of correcting means acting both on the transmission fed by the main transmitter and on the electric circuit controlled by the first auxiliary transmitter.

5. A distant electric transmission of angular movements comprising a main transmitter, at least one main receiver, an at least partly electric transmission fed by the transmitter and controlling the receiver, means controlling the transmitter, an auxiliary transmitter system including a plurality of elementary transmitters controlled at different staged speeds by the means controlling the first transmitter, a part controlled by each receiver, a second auxiliary transmitter system also including a plurality of elementary transmitters controlled at speeds corresponding to those of the first plurality of elementary transmitters, by said part, a differential receiver system including a plurality of elementary differential receivers, couples of electric circuits of equal impedances controlled respectively by the corresponding elementary transmitters of the two auxiliary transmitter systems and controlling the corresponding elementary differential receivers, a distributor controlled by each elementary receiver, a reversing switch system adapted to be brought into operation in succession, in accordance with the direction corresponding to restoration of concordance between the main transmitter and the part controlled by the main receiver, by the distributors corresponding to the different elementary receivers considered in their order of increasing speeds, an auxiliary electric motor system, means for feeding same adapted to be closed by the reversing switch system when operative and means whereby the said auxiliary motor system acts on the transmission controlling the main receiver for restoring concordance.

6. A distant electric transmission of angular movements comprising a main transmitter, at least one main receiver, an at least partly electric transmission fed by the transmitter and controlling the receiver, means controlling the transmitter, an auxiliary transmitter system including a plurality of elementary transmitters controlled at different staged speeds by the means controlling the first transmitter, a part controlled by each receiver, a second auxiliary transmitter system also including a plurality of elementary transmitters controlled at speeds corresponding to those of the first plurality of elementary transmitters, by said part, a differential receiver system including a plurality of elementary differential receivers, couples of electric circuits of equal impedances respectively controlled by the corresponding elementary transmitters of the two auxiliary transmitter systems and controlling the corresponding elementary differential receivers, a distributor corresponding to each elementary receiver and including two semi-circular conducting segments, insulating parts separating same and contacts adapted to rub over said segments, means whereby each elementary receiver controls the relative movement of the contacts over the segments of the corresponding distributor, a reversing switch system, means for feeding same, means whereby the contacts as they pass away from their neutral position over the insulating parts of the distributor close the switch system feeding means for making said switch system assume either of its two operative functions according to the direction of shift of the contacts over the conducting segments, means whereby each distributor as it is returned into its neutral position brings into operativeness the following faster moving distributor, an auxiliary electric motor system, means for feeding same adapted to be closed in either direction by the reversing switch system when operative and means whereby the said auxiliary motor system acts on the transmission controlling the main receiver for restoring concordance.

7. A distant electric transmission of angular movements comprising a main transmitter, at least one main receiver, an at least partly electric transmission fed by the transmitter and controlling the receiver, means controlling the transmitter, an auxiliary transmitter system including a plurality of elementary transmitters controlled at different staged speeds by the means controlling the first transmitter, a part controlled by each receiver, a second auxiliary transmitter system also including a plurality of elementary transmitters controlled at speeds corresponding to those of the first plurality of elementary transmitters, by said part, a differential receiver including a plurality of elementary differential receivers, couples of electric circuits of equal impedances controlled respectively by the corresponding elementary transmitters of the two auxiliary transmitters and controlling the corresponding elementary differential receivers, a distributor corresponding to each elementary receiver and including two semi-circular conducting segments, insulating parts separating same and diametrically opposite contacts adapted to rub over said segments, means whereby each elementary receiver controls the relative movement of the contacts over the segments of the corresponding distributor, a reversing switch, means for feeding same, means whereby the contacts as they pass away from their neutral position over the insulating parts of the distributor close the switch feeding means with a polarity corresponding to the direction of shift of the contacts over the conducting segments, an insulating disc coaxial with the conducting segments of each distributor, contacts provided in said disc facing the insulating parts of the distributor considered, means for connecting the disc contacts of each distributor with the corresponding contacts rubbing over the segments of the following faster moving distributor, an auxiliary electric motor, means for feeding same adapted to be closed in either direction by the reversing switch when operative and means whereby the said auxiliary motor acts on the transmission controlling the main receiver for restoring concordance.

8. A distant electric transmission of angular movements comprising a main transmitter, at least one main receiver, an at least partly electric transmission fed by the transmitter and controlling the receiver, means controlling the transmitter, an auxiliary transmitter system including a plurality of elementary transmitters controlled at different staged speeds by the means controlling the first transmitter, a part controlled by each receiver, a second auxiliary transmitter system also including a plurality of elementary transmitters controlled at speeds corresponding to those of the first plurality of elementary transmitters, by said part, a differential receiver system including a plurality of elementary differential receivers, couples of electric circuits of equal impedances controlled respectively by the corresponding elementary transmitters of the two auxiliary transmitter systems and controlling the corresponding elementary differential receivers, a distributor corresponding to each elementary receiver and including two semicircular conducting segments, insulating parts separating same and diametrically opposite contacts adapted to rub over said segments, means whereby each elementary receiver controls the relative movement of the contacts over the segments of the corresponding distributor, a reversing switch corresponding to each distributor, a circuit feeding same, means whereby the contacts as they pass away from their neutral position over the insulating parts of their distributor close the corresponding switch circuit with a polarity corresponding to the direction of shift of the contacts over their conducting segments, means whereby each distributor when operative prevents operativeness of the following faster moving distributors, an electric motor, means whereby the switches corresponding to distributors of faster moving receivers cause said motor to rotate at increasingly slow rates in the direction corresponding to the above defined direction of shift and means whereby the auxiliary motor acts on the transmission controlling the main receiver.

9. A distant electric transmisison of angular movements comprising a main transmitter, at least one main receiver, an at least partly electric transmission fed by the transmitter and controlling the receiver, means controlling the transmitter, an auxiliary transmitter system including a plurality of elementary transmitters controlled at different staged speeds by the means controlling the first transmitter, a part controlled by each receiver, a second auxiliary transmitter system also including a plurality of elementary transmitters controlled at speeds corresponding to those of the first plurality of elementary transmitters by said part, a differential receiver system including a plurality of elementary differential receivers, couples of electric circuits of equal impedances respectively controlled by the corresponding elementary transmitters of the two auxiliary transmitter systems and controlling the corresponding elementary differential receivers, a distributor corresponding to each elementary receiver and including two opposed yielding contact systems and an armature controlled by the corresponding elementary receiver and adapted to close either contact system, a reversing switch system, means for feeding same, means whereby the armature as it passes away from its neutral position between the contact systems closes the switch system feeding means with a polarity corresponding to the contact system closed by the armature, means whereby each armature as it is returned into its neutral position brings into operativeness the following faster moving distributor, an auxiliary electric motor system, means for feeding same adapted to be closed in either direction by the reversing switch system when operative and means whereby the said auxiliary motor system acts on the transmission controlling the main receiver for restoring concordance.

10. A distant electric transmission of angular movements comprising a main transmitter, at least one main receiver, an at least partly electric transmission fed by the transmitter and controlling the receiver, means controlling the transmitter, an auxiliary transmitter system including a plurality of elementary transmitters controlled at different staged speeds by the means controlling the first transmitter, a part controlled by each receiver, a second auxiliary transmitter system also including a plurality of elementary transmitters controlled at speeds corresponding to those of the first plurality of elementary transmitters, by said part, a differential receiver system including a plurality of elementary differential receivers, electric circuits of equal impedance controlled respectively by the corresponding elementary transmitters of the two auxiliary transmitter systems and controlling the corresponding elementary differential receivers, a distributor corresponding to each elementary receiver and including two opposed yielding contact systems and an armature controlled by the corresponding elementary receiver and adapted to close either contact system, a reversing switch, means for feeding same, means whereby each armature as it passes away from its neutral position between the contact systems is adapted to close the switch feeding means with a polarity corresponding to the contact system closed by the armature, a central contact adapted to be closed by each armature in its neutral position and electrically connected with the contacts of the next faster moving distributor, an auxiliary electric motor, means for feeding same adapted to be closed in either direction by the reversing switch when operative and means whereby the said auxiliary motor acts on the transmission controlling the main receiver for restoring concordance.

11. In a transmission as claimed in claim 2 an arrangement for reversing the direction of rotation of the auxiliary motor system whenever the angular shifting of the transmitter controlling means with reference to the part controlled by the main receiver, measured through the allowed zone of rotation of last mentioned part, is above 180°

12. In a transmission as claimed in claim 2 an arrangement for reversing the direction of rotation of the auxiliary motor system whenever the angular shifting of the transmitter controlling means with reference to the part controlled by the main receiver, measured through the allowed zone of rotation of last mentioned part, is above 180° and including two stationary semi-annular concentric electrically interconnected diametrically opposed conducting parts of different diameters, two similar semi-annular parts coaxial with the former, insulated one with reference to the other, moving in unison with the means controlling the transmitters, and two adjacent ends of which directed to the opposite of the direction of last mentioned means are angularly reduced by equal amounts and two pairs of electrically interconnected contacts adapted to rub respectively on the movable and stationary annular parts of smaller and larger diameter, a radial arm to which said pairs of interconnected contacts are secured with opposite angular spacings and moving in unison with the part controlled by the main receiver, a reversing switch adapted to provide reversal of the rotation of the auxiliary motor system and contacts adapted to energize same and lying along the radius corresponding to the direction separating the two semi-annular parts at a point allowing contact with the two movable semi-annular parts respectively.

13. In a transmission as claimed in claim 2 an arrangement for reversing the direction of rotation of the auxiliary motor system whenever the angular shifting of the transmitter controlling means with reference to the part controlled by the main receiver, measured through the allowed zone of rotation of last mentioned part, is above 180° and including two stationary semi-annular concentric electrically interconnected diametrically opposed conducting parts of different diameters, two rotary similar semi-annular parts coaxial with the former, insulated one with reference to the other, moving in unison respectively with the means controlling the transmitters, and the auxiliary receiver and the ends of which directed to the opposite of the direction of last mentioned means are angularly reduced by equal amounts and two pairs of electrically interconnected contacts adapted to rub respectively on the movable and stationary semi-annular parts of smaller and larger diameter, a radial arm to which said pairs of interconnected contacts are secured with opposite angular spacings equal to the angular reduction of the moving annular parts and controlled respectively by the auxiliary receiver and by the means controlling the transmitter, a reversing switch adapted to provide reversal of the rotation of the auxiliary motor system and contacts adapted to energize same and lying along the radius corresponding to the direction separating the two semi-annular parts at a point allowing contact with the two movable semi-annular parts respectively.

14. A distant electric transmission of angular movements comprising a main transmitter, at least one main receiver, an at least partly electric transmission fed by the transmitter and controlling the receiver, means controlling the transmitter, an auxiliary transmitter system including a plurality of elementary transmitters controlled at different staged speeds by the means controlling the first transmitter, a part controlled by each receiver, a second auxiliary transmitter system also including a plurality of elementary transmitters controlled at speeds corresponding to those of the first plurality of elementary transmitters by said part, a differential receiver system including a plurality of elementary differential receivers, the slowest moving differential receiver comprising two independent motors, couples of electric circuits of equal impedance controlled respectively by the corresponding elementary transmitters of the two auxiliary transmitter systems and controlling differentially the corresponding elementary differential receiver, a distributor controlled by each elementary receiver and constituted in the case of the slowest moving receiver by two semi-annular segments of equal radii, a double switch system either portion of which is adapted to be closed in succession, according to the direction corresponding to restoration of concordance between the main transmitter and the part controlled by the main receiver, by the distributors corresponding to the different elementary receivers considered in their order of increasing speeds, an auxiliary electric motor system, means for feeding same adapted to be closed by the switch system when operative, means whereby the said auxiliary motor system acts on the transmission controlling the main receiver for restoring concordance, two stationary semi-annular concentric electrically interconnected diametrically opposed conducting parts of different diameters, two rotary similar semi-annular parts coaxial with the former and with the semi-annular segments, insulated one with reference to the other, moving in unison with one of the motors of the slowest moving receiver and the ends of which are angularly reduced by equal amounts, two pairs of electrically interconnected contacts adapted to rub respectively on the movable and stationary semi-annular parts of smaller and larger diameter, a radial arm carrying the semi-annular segments and to which said pairs of interconnected contacts are secured with opposite angular spacings equal to the angular reduction of the moving annular parts and controlled by the other motor of the slowest moving receiver, a reversing switch adapted to provide reversal of the rotation of the auxiliary motor system, contacts adapted to energize same, connected electrically with the stationary semi-annular parts and lying respectively in the path of the movable annular parts along the radius corresponding to the direction separating the two semi-annular stationary parts, contacts in the double switch system one of which is stationary, and lies in the path of the semi-annular segments while the other is adapted to rotate with the set of rotary semi-annular parts and means carried by the radial arm, electrically connected with the stationary contact and adapted to engage the rotary contact when the two independent receiver motors are angularly shifted through 180°.

15. In a transmission as claimed in claim 2 an arrangement for reversing the direction of rotation of the auxiliary motor system whenever the angular shifting of the transmitter controlling means with reference to the part controlled by the main receiver, measured through the allowed zone of rotation of last mentioned part, is above 180° and including two stationary semi-annular concentric electrically interconnected diametrically opposed conducting parts of different diameters, two similar semi-annular parts coaxial with the former, insulated one with reference to the other, moving in unison with the means controlling the transmitters, and two adjacent ends of which are angularly reduced by equal amounts, two pairs of electrically interconnected contacts adapted to rub respectively on the movable and stationary annular parts of smaller and larger diameter, a radial arm to which said pairs of interconnected contacts are secured with opposite angular spacings equal to the angular reduction of the moving annular parts and moving in unison with the part controlled by the main receiver, a reversing switch adapted to provide reversal of the rotation of the auxiliary motor system and contacts adapted to energize same and lying along the radius corresponding to the direction separating the two semi-annular parts at a point allowing contact with the two movable semi-annular parts respectively.

16. In a transmission as claimed in claim 2 an arrangement for reversing the direction of rotation of the auxiliary motor system whenever the angular shifting of the transmitter controlling means with reference to the part controlled by the main receiver, measured through the allowed zone of rotation of last mentioned part, is above 180° and including two stationary semi-annular concentric electrically interconnected diametrically opposed conducting parts of different diameters, two similar semi-annular parts coaxial with the former, insulated one with reference to the other, moving in unison with the means controlling the transmitters, and the ends of which are angularly reduced by equal amounts, two pairs of electrically interconnected contacts adapted to rub respectively on the movable and stationary annular parts of smaller and larger diameter, a radial arm to which said pairs of interconnected contacts are secured with opposite angular spacings and moving in unison with the part controlled by the main receiver, a reversing switch adapted to provide reversal of the rotation of the auxiliary motor system, contacts adapted to energize same, lying respectively over the path of the two movable semi-annular parts along the radius corresponding to the direction separating the two semi-annular stationary parts, stops limiting the angular movement of the radial arm to either side of the direction separating the two semi-annular stationary parts by angular amounts equal to the spacing between the radial arm and the contacts carried thereby.

17. In a transmission as claimed in claim 2 an arrangement for reversing the direction of rotation of the auxiliary motor system whenever the angular shifting of the transmitter controlling means with reference to the part controlled by the main receiver, measured through the allowed zone of rotation of last mentioned part, is above 180° and including two stationary semi-annular concentric electrically interconnected diametrically opposed conducting parts of different diameters, two similar semi-annular parts coaxial with the former, insulated one with reference to the other, moving in unison with the means controlling the transmitters, and the ends of which are angularly reduced by equal amounts equal at least to half the angular extent of the forbidden zone of rotation of the part controlled by the main receiver, two pairs of electrically interconnected contacts adapted to rub respectively on the movable and stationary annular parts of smaller and larger diameter, a radial arm to which said pairs of interconnected contacts are secured with opposite angular spacings and moving in unison with the part controlled by the main receiver, a reversing switch adapted to provide reversal of the rotation of the auxiliary motor system and contacts adapted to energize same and lying along the radius corresponding to the direction separating the two semi-annular parts at a point allowing contact with the two movable semi-annular parts respectively.

ELIE GRANAT.